US011932124B2

(12) United States Patent
Kawase et al.

(10) Patent No.: US 11,932,124 B2
(45) Date of Patent: Mar. 19, 2024

(54) ELECTRICALLY DRIVEN VEHICLE INCLUDING WIRE HARNESS COVER

(71) Applicants: TOYOTA JIDOSHA KABUSHIKI KAISHA, Toyota (JP); SUBARU CORPORATION, Tokyo (JP)

(72) Inventors: Kyosuke Kawase, Okazaki (JP); Ryo Kimura, Tokyo (JP); Kazuya Kushibiki, Tokyo (JP)

(73) Assignees: TOYOTA JIDOSHA KABUSHIKI KAISHA, Toyota (JP); SUBARU CORPORATION, Tokyo (JP)

( * ) Notice: Subject to any disclaimer, the term of this patent is extended or adjusted under 35 U.S.C. 154(b) by 95 days.

(21) Appl. No.: 17/474,330

(22) Filed: Sep. 14, 2021

(65) Prior Publication Data

US 2022/0080840 A1 Mar. 17, 2022

(30) Foreign Application Priority Data

Sep. 16, 2020 (JP) .................................. 2020-155801

(51) Int. Cl.
*B60K 1/04* (2019.01)
*B60L 50/60* (2019.01)
*B60R 16/02* (2006.01)

(52) U.S. Cl.
CPC ................ *B60L 50/66* (2019.02); *B60K 1/04* (2013.01); *B60R 16/0215* (2013.01); *B60K 2001/0438* (2013.01)

(58) Field of Classification Search
CPC ... B60L 50/66; B60K 1/04; B60K 2001/0438; B60R 16/0215
See application file for complete search history.

(56) References Cited

U.S. PATENT DOCUMENTS

| 5,588,123 A * | 12/1996 | Loibl .................. B60R 16/0315 |
| | | 701/32.7 |
| 10,960,836 B2 * | 3/2021 | Satake ..................... B60K 1/04 |
| 2001/0013725 A1 * | 8/2001 | Mizuguchi .......... B60R 16/0207 |
| | | 307/10.1 |
| 2020/0247225 A1 * | 8/2020 | Kochi ..................... B60L 50/64 |

FOREIGN PATENT DOCUMENTS

| JP | H05207610 A | 8/1993 |
| JP | 2000-108948 A | 4/2000 |
| JP | 2004268803 A | 9/2004 |
| JP | 2017-197093 A | 11/2017 |
| JP | 2020104560 A | 7/2020 |
| JP | 2020124966 A | 8/2020 |

* cited by examiner

*Primary Examiner* — Jason D Shanske
*Assistant Examiner* — James J Triggs
(74) *Attorney, Agent, or Firm* — Dinsmore & Shohl LLP

(57) ABSTRACT

An electrically driven vehicle includes at least one wheel driven by a motor, a vehicle body including a floor panel, a battery pack arranged on the lower side of the floor panel and configured to supply power to the motor, at least one wire harness extending in a front-rear direction of the electrically driven vehicle between the floor panel and the battery pack, and a harness cover extending in the front-rear direction of the electrically driven vehicle along the at least one wire harness and interposed between the at least one wire harness and the battery pack.

10 Claims, 5 Drawing Sheets

ELECTRICALLY DRIVEN VEHICLE INCLUDING WIRE HARNESS COVER

CROSS-REFERENCE TO RELATED APPLICATION

This application claims priority to Japanese Patent Application No. 2020-155801 filed on Sep. 16, 2020, incorporated herein by reference in its entirety.

BACKGROUND

1. Technical Field

The technology disclosed in the present specification relates to an electrically driven vehicle, and, in particular, to the front-portion structure of the electrically driven vehicle. Here, the "electrically driven vehicle" broadly means a vehicle in which one or a plurality of wheels is driven by a motor. Examples of the electrically driven vehicle include a rechargeable electric vehicle charged by an external power source, a fuel cell vehicle of which a power source is a fuel cell, and a hybrid vehicle that also has an engine.

2. Description of Related Art

Japanese Unexamined Patent Application Publication No. 2017-197093 (JP 2017-197093 A) discloses an electrically driven vehicle. This electrically driven vehicle includes a vehicle body having a floor panel and a battery pack arranged on the lower side of the floor panel. The battery pack contains a rechargeable and dischargeable secondary battery so as to store power supplied to the motor. The electrically driven vehicle further includes a wire harness connected to the battery pack. The wire harness is arranged inside a side sill (also referred to as a rocker) positioned on the right side of the floor panel in the vehicle width direction, and extends in the vehicle front-rear direction.

SUMMARY

In the electrically driven vehicle disclosed in JP 2017-197093 A, a wire harness is arranged on the outside of the battery pack in the vehicle width direction. For this reason, when a side collision occurs in the electrically driven vehicle, the wire harness may be damaged. In order to avoid this, it is conceivable to arrange the wire harness between the floor panel and the battery pack. However, since the wire harness is generally flexible, it is likely to move in the vertical direction due to vibration or impact during traveling of the vehicle. For this reason, when the wire harness is arranged between the floor panel and the battery pack, the wire harness that moves in the vertical direction may damage the battery pack. In order to avoid this, it is necessary to provide a large space between the floor panel and the battery pack, and as a result, the space in the vehicle cabin may be reduced. The present specification provides a new technology for arranging a wire harness between a floor panel and a battery pack.

An electrically driven vehicle according to an aspect of the present disclosure includes at least one wheel driven by a motor, a vehicle body including a floor panel, a battery pack arranged on a lower side of the floor panel and configured to supply power to the motor, at least one wire harness extending in a front-rear direction of the electrically driven vehicle between the floor panel and the battery pack, and a harness cover extending in the front-rear direction of the electrically driven vehicle along the at least one wire harness and interposed between the at least one wire harness and the battery pack.

In the above-described electrically driven vehicle, the harness cover is interposed between at least one wire harness and the battery pack and extends in the vehicle front-rear direction. As such, even when the wire harness moves in the vertical direction due to vibration during traveling of the vehicle, the harness cover prevents the wire harness from contacting the battery pack. As a result, the space between the wire harness and the battery pack can be reduced.

In the above aspect, the electrically driven vehicle may include a plurality of wire harnesses.

In the above aspect, the wire harness may be fixed to the harness cover.

In the above aspect, the harness cover may be fixed to the floor panel.

In the above aspect, the harness cover may be configured to be detachable from the floor panel in a state where the wire harness is fixed to the harness cover.

In the above aspect, the wire harness may include a first wire harness for power.

In the above aspect, the first wire harness for power may transmit power between the motor and the battery pack.

In the above aspect, the wire harness may further include a second wire harness for power, and a rated voltage of the second wire harness may be smaller than a rated voltage of the first wire harness for power.

In the above aspect, the wire harness may include a wire harness for signaling.

In the above aspect, the wire harness for signaling may include a signal line that transmits or receives a signal associated with the motor.

Details of the technology disclosed in the present specification and further improvements will be described in the "DETAILED DESCRIPTION OF EMBODIMENTS" below.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Figure 1:
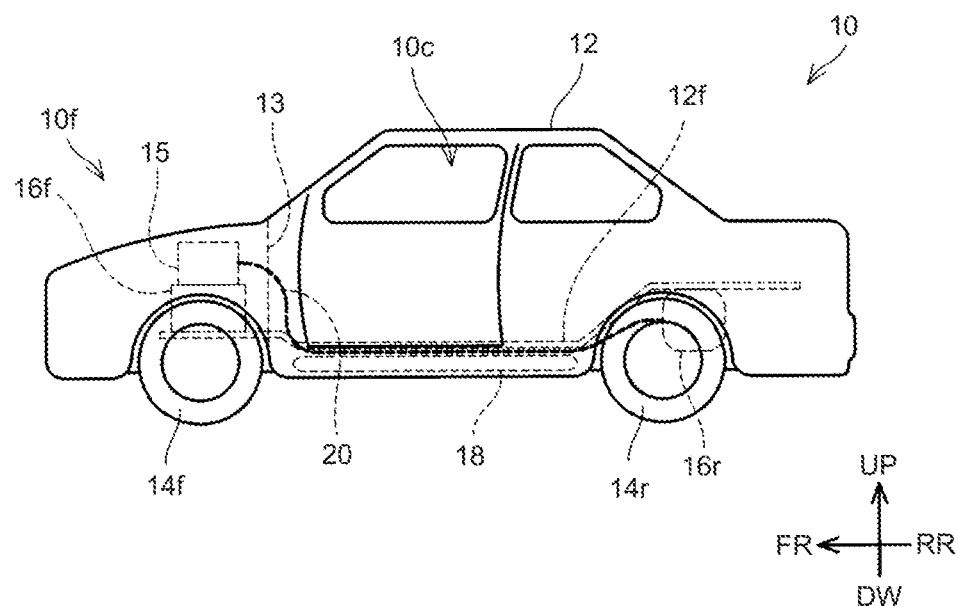
FIG. 1 is a side view schematically illustrating a configuration of an electrically driven vehicle according to an embodiment.

In one embodiment of the present technology, an electrically driven vehicle may include a plurality of wire harnesses. By covering the wire harnesses with a common harness cover, the space required between a floor panel and a battery pack can be reduced.

In one embodiment of the present technology, the wire harness may be fixed to the harness cover. With such a configuration, it is possible to restrict movement and vibration of the wire harness and avoid damage to the wire harness itself. Further, it is possible to restrict a situation where, for example, the wire harness contacts the floor panel, causing vibration or noise unpleasant to a user.

In the above-described embodiment, the harness cover may be fixed to the floor panel. However, in other embodiments, the harness cover may be fixed to the battery pack in addition to or instead of the floor panel.

In one embodiment of the present technology, the harness cover may be configured to be detachable from the floor panel in a state where at least one wire harness is fixed to the harness cover. With such a configuration, at least one wire harness can be easily attached to and detached from the vehicle body in the production or maintenance of the electrically driven vehicle. Since the harness cover is attached and detached regardless of the type or the number of wire harnesses, it is possible to promote simplification of, for example, a work procedure in the production or maintenance.

In one embodiment of the present technology, at least one wire harness may include a first wire harness for power. The first wire harness for power may transmit power between the motor and the battery pack. Since the first wire harnesses for power are relatively thick and heavy, the battery pack may be severely damaged when the wire harnesses move or vibrate. The present technology can be appropriately employed for such a wire harness for power.

In the above embodiment, at least one wire harness may further include a second wire harness for power. In this case, a rated voltage of the second wire harness may be smaller than a rated voltage of the first wire harness. As such, at least one wire harness may include a plurality of wire harnesses with different rated voltages.

In addition to or instead of the wire harnesses for power, at least one wire harness may include a wire harness for signaling. In this case, the wire harness for signaling may include, but is not particularly limited to, a signal line that transmits or receives a signal associated with the motor. Here, the signal associated with the motor may include, but is not particularly limited to, for example, a control signal for the motor or a detection signal indicating a state index (for example, a temperature index or a current index) detected at the motor.

The electrically driven vehicle of the embodiment will be described with reference to drawings. In the present specification, in the drawing, the direction FR represents the front side in the front-rear direction (the longitudinal direction) of an electrically driven vehicle 10 and the direction RR represents the rear side in the front-rear direction of the electrically driven vehicle 10. Further, the direction LH represents the left side in the right-left direction (the width direction) of the electrically driven vehicle 10 and the direction RH represents the right side in the right-left direction of the electrically driven vehicle 10. Then, the direction UP represents the upper side in the vertical direction (the height direction) of the electrically driven vehicle 10 and the direction DN represents the lower side in the vertical direction of the electrically driven vehicle 10. In the present specification, the front-rear direction, the right-left direction, and the vertical direction of the electrically driven vehicle 10 may be simply referred to as the front-rear direction, the right-left direction, and the vertical direction, respectively.

As illustrated in FIG. 1, the electrically driven vehicle 10 includes a body 12, a pair of front wheels 14f, and a pair of rear wheels 14r. The body 12 is made of metal, but is not particularly limited thereto. The body 12 includes a dash panel 13 and a floor panel 12f. The dash panel 13 is arranged at the front portion of the floor panel 12f. The dash panel 13 extends upward from the floor panel 12f. The dash panel 13 is a wall that defines a cabin 10c and a front compartment 10f. The floor panel 12f extends in the vehicle front-rear direction across a pair of front wheels 14f and a pair of rear wheels 14r. The floor panel 12f forms a floor of the cabin 10c.

The electrically driven vehicle 10 further includes a front motor 16f, a rear motor 16r, a battery pack 18, an electric unit 15, and a wire harness 20. The front motor 16f and the electric unit 15 are housed in the front compartment 10f. The front motor 16f drives the front wheels 14f. The rear motor 16r drives the rear wheels 14r. The electrically driven vehicle 10 is a so-called four-wheel drive electrically driven vehicle. The battery pack 18 contains a plurality of secondary battery cells and is configured to be repeatedly rechargeable by external power. Power stored in the battery pack 18 is supplied to the front motor 16f and the rear motor 16r via the electric unit 15. The battery pack 18 is flat-shaped and is arranged on the lower side of the floor panel 12f. The larger the capacity of the battery pack 18 is, the longer a distance that the electrically driven vehicle 10 can continuously travel becomes. By arranging the flat battery pack 18 on the lower side of the floor panel 12f, the electrically driven vehicle 10 secures a storage space for the battery pack 18 having a large capacity.

As illustrated in FIG. 1, the electric unit 15 is connected to the rear motor 16r via the wire harness 20. As to be described in detail below, the wire harness 20 includes a first wire harness 20m and a second wire harness 20w with different rated voltages. Each of the wire harnesses 20m and 20w is composed of a bundle of a plurality of electric lines. Further, although not shown, the electric unit 15 is also connected to the front motor 16f via a different wire harness. In addition, although not shown, the wire harness 20 is also connected to the battery pack 18. A plurality of wire harnesses 20 passes through the dash panel 13, extends between the floor panel 12f and the battery pack 18 in the front-rear direction, and is connected to the rear motor 16r.

The electric unit 15 may include, for example, a DC-DC converter (not shown) and can boost power supplied from the battery pack 18 to the front motor 16f and the rear motor 16r. Power boosted by the electric unit 15 is supplied to the front motor 16f and the rear motor 16r. At that time, power is converted into a three-phase alternating current voltage by an inverter (not shown) included in each of the motors 16f, 16r. As such, power stored in the battery pack 18 is supplied to the front motor 16f and the rear motor 16r. The front motor 16f, the rear motor 16r, the battery pack 18, and the electric unit 15 are so-called high-voltage components, and are electric components that operate at an alternating current voltage exceeding 30 volts or a direct current voltage exceeding 60 volts.

Figure 2:
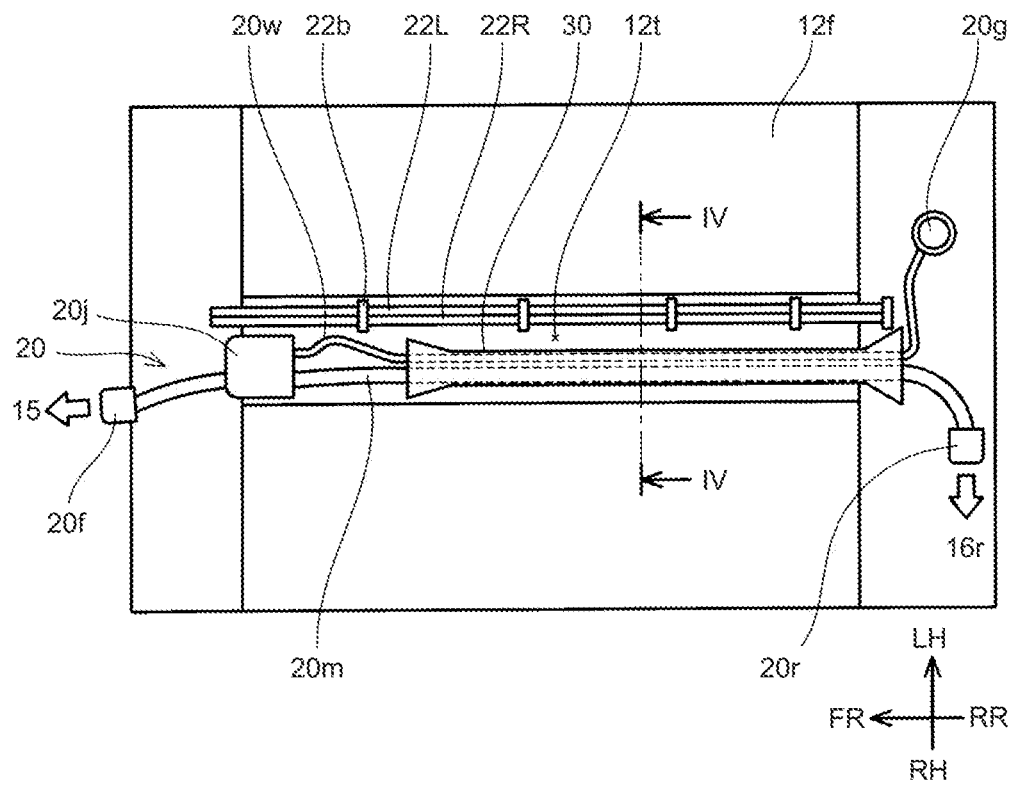
FIG. 2 is a bottom view of a floor panel.

With reference to FIG. 2, a structure of a lower surface of the floor panel 12f of the electrically driven vehicle 10 (see FIG. 1) will be described. To make the figure easier to understand, in FIG. 2, none of the electric unit 15, the front motor 16f, the rear motor 16r, or the battery pack 18 are not shown.

The floor panel 12f includes a tunnel portion 12t extending in the front-rear direction at the center thereof in the right-left direction. The tunnel portion 12t is a space formed when the floor panel 12f projects upward (that is, in the depth direction of the paper sheet of FIG. 2). Inside the tunnel portion 12t, the wire harness 20 and two cooling pipes 22R, 22L are arranged. A front end connector 20f of the wire harness 20 is connected to the electric unit 15. The wire harness 20 includes a junction box 20*j*. The wire harness 20 is branched into a first wire harness 20*m* and a second wire harness 20*w* at the junction box 20*j*. The first wire harness 20*m* is bent to the right side on the vehicle rear side (that is, downward on the paper sheet of FIG. 2). A rear end connector 20*r* of the first wire harness 20*m* is connected to the rear motor 16*r*. The second wire harness 20*w* is bent to the left side on the vehicle rear side (that is, upward on the paper sheet of FIG. 2). The rear end of the second wire harness 20*w* is connected to a grommet 20*g*. Further, although not shown, the wire harness branched at the junction box 20*j* is connected to the battery pack 18.

On the left side of the wire harness 20 (that is, the upper side on the paper sheet of FIG. 2), the two cooling pipes 22R, 22L are arranged. The two cooling pipes 22R, 22L are made of resin. Inside the two cooling pipes 22R, 22L, a refrigerant (for example, a coolant) that cools the battery pack 18, the rear motor 16*r*, or the like, circulates. The two cooling pipes 22R, 22L are fixed to the floor panel 12*f* from the lower side (that is, the front side of the paper sheet of FIG. 2) by a pipe band 22*b*. In FIG. 2, only the pipe band 22*b* positioned on the most forward side is denoted by a reference sign, and the reference signs of the other pipe bands 22*b* are omitted.

As illustrated in FIG. 2, a part of the wire harness 20 is covered with the harness cover 30 from the lower side. The harness cover 30 is a sheet metal part extending in the front-rear direction. The length of the harness cover 30 in the front-rear direction may be, for example, a length exceeding 1 m.

Figure 3:
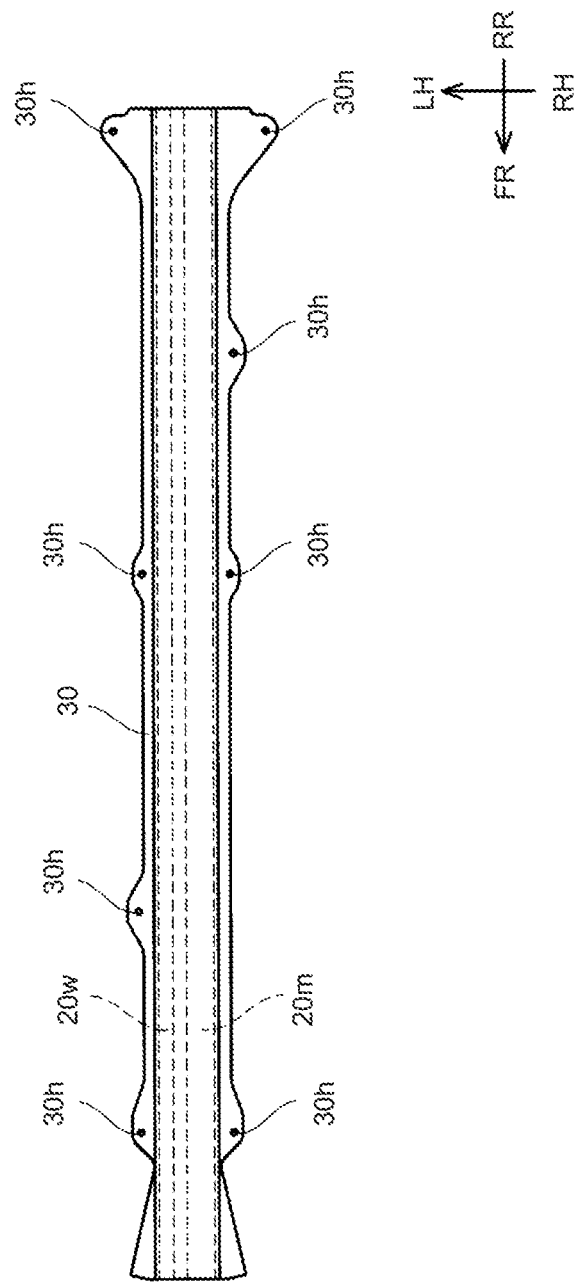
FIG. 3 is a bottom view of a harness cover.
Figure 4:
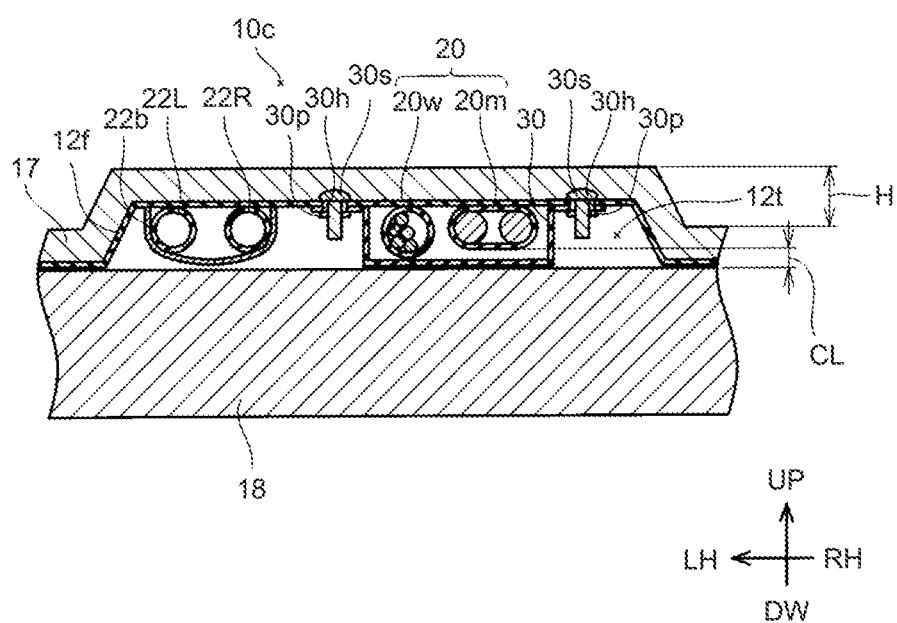
FIG. 4 is a cross-sectional view along a line IV-IV of FIG. 2.

A structure of the harness cover 30 will be described with reference to FIGS. 3 and 4. As illustrated in FIG. 4, the harness cover 30 projects downward at the central portion in the right-left direction thereof, and houses the first wire harness 20*m* and the second wire harness 20*w* inside. As illustrated in FIG. 3, the harness cover 30 includes a plurality of fixing holes 30*h* arranged on both the right and left sides. The harness cover 30 includes a total of eight fixing holes 30*h*, that is, four holes on each side in the right-left direction. The fixing hole 30*h* penetrates the harness cover 30 in the vertical direction. The fixing hole 30*h* is a hole used for fixing the harness cover 30 to the floor panel 12*f*.

A structure of fixing the harness cover 30 to the floor panel 12*f* will be described with reference to FIG. 4. First, the harness cover 30 is arranged on the lower side of the floor panel 12*f*. The floor panel 12*f* is provided with a through hole at a position facing the fixing hole 30*h* of the harness cover 30. A bolt 30*s* is arranged so as to insert the through hole of the floor panel 12*f* and the fixing hole 30*h* of the harness cover 30 from the upper side of the floor panel 12*f*. A nut 30*p* is screwed into the bolt 30*s* from the lower side of the harness cover 30. As such, the floor panel 12*f* and the harness cover 30 are sandwiched between the head of the bolt 30*s* and the upper surface of the nut 30*p*. In other words, the harness cover 30 is fixed to the floor panel 12*f*. With such a configuration, by removing the nut 30*p*, the harness cover 30 can be relatively simply removed from the floor panel 12*f*.

As illustrated in FIG. 4, a floor carpet 17 is arranged on the upper side of the floor panel 12*f*. The surface of the floor carpet 17 is flocked. An occupant boards the upper surface of the floor carpet 17 of the electrically driven vehicle 10 (see FIG. 1). In other words, the upper side of the floor carpet 17 is the cabin 10*c* of the electrically driven vehicle 10.

As described above with reference to FIG. 1, the battery pack 18 is arranged on the lower side of the floor panel 12*f*.

As described above, the battery pack 18 is laid all over under the lower surface of the floor panel 12*f*.

The wire harness 20 and the two cooling pipes 22R, 22L are arranged between the floor panel 12*f* and the battery pack 18. As described above, the wire harness 20 and the two cooling pipes 22R, 22L extend in the front-rear direction, and the length thereof is the same as that of the cabin 10*c* of the electrically driven vehicle 10. In other words, the wire harness 20 and the two cooling pipes 22R, 22L extend for a relatively long distance in the front-rear direction.

Here, the two cooling pipes 22R, 22L are made of resin. For this reason, the two cooling pipes 22R, 22L have relatively high rigidity. As described above with reference to FIG. 2, the two cooling pipes 22R, 22L are fixed to the floor panel 12*f* by the five pipe bands 22*b*. The two cooling pipes 22R, 22L having high rigidity do not move in the vertical direction even when vibration or impact occurs in the electrically driven vehicle 10 during traveling. For this reason, the two cooling pipes 22R, 22L do not contact the upper surface of the battery pack 18 even when vibration or impact occurs in the electrically driven vehicle 10 during traveling.

On the other hand, as described above, in the wire harness 20, a plurality of electric lines is bundled with, for example, a vinyl tape. The wire harness 20 has lower rigidity than the cooling pipes 22R, 22L. When vibration or impact occurs in the electrically driven vehicle 10 during traveling, the wire harness 20 is likely to move in the vertical direction. If the wire harness 20 is not covered with the harness cover 30 from the lower side, the wire harness 20 would likely contact the upper surface of the battery pack 18 when vibration or impact occurs in the electrically driven vehicle 10 during traveling.

In the electrically driven vehicle 10 according to the embodiment, as illustrated in FIG. 3, the wire harness 20 is covered with the harness cover 30 from the lower side. As illustrated in FIGS. 2 and 3, the harness cover 30 extends in the front-rear direction along the wire harness 20. The harness cover 30 covers more than half of the length of the wire harness 20 in the front-rear direction from the lower side. For this reason, even when vibration or impact occurs in the electrically driven vehicle 10 during traveling and the wire harness 20 moves in the vertical direction, the harness cover 30 can prevent the wire harness 20 from contacting the upper surface of the battery pack 18.

As a result, as illustrated in FIG. 4, the gap CL in the vertical direction between the wire harness 20 and the battery pack 18 can be reduced. As a result, the height of the tunnel portion 12*t* of the floor panel 12*f* becomes low. For this reason, the height H of a step difference of the floor carpet 17 formed by the tunnel portion 12*t* becomes lower. It is possible to restrict the cabin 10*c* from becoming narrow due to the arrangement of the wire harness 20 between the floor panel 12*f* and the battery pack 18. Further, by reducing the height H of the step difference of the floor carpet 17 formed by the tunnel portion 12*t*, the discomfort felt by the occupant of the electrically driven vehicle 10 can also be reduced.

As illustrated in FIG. 4, the first wire harness 20*m* is composed of two electric lines. The first wire harness 20*m* is a wire harness for power that transmits power of the battery pack 18 to the rear motor 16*r*. The first wire harness 20*m* is a wire harness for a high voltage and transmits a relatively large amount of power to the rear motor 16*r* at a high voltage. For this reason, each electric line composing the first wire harness 20*m* is relatively thick and heavy.

On the other hand, the second wire harness 20w may include, but is not particularly limited to, for example, a wire harness that transmits power to a power outlet arranged in a luggage compartment at the rear side of the cabin 10c of the electrically driven vehicle 10. A user of the electrically driven vehicle 10 can connect an electric device to the power outlet of the luggage compartment and use power of the battery pack 18. Further, the second wire harness 20w may also include, for example, a wire harness that transmits power generated by a solar panel (not shown) arranged on the upper surface of the body 12 of the electrically driven vehicle 10 to each lamp arranged in the luggage compartment. The second wire harness 20w is a wire harness for a low voltage, and transmits a relatively small amount of power at a low voltage. For this reason, as compared with the first wire harness 20m, each electric line composing the second wire harness 20w is relatively thin and light. The second wire harness 20w may also further include a wire harness for signaling. The wire harness for signaling may be, for example, a wire harness that transmits a control signal to the rear motor 16r or a detection signal indicating a state index (for example, a temperature index and a current index) detected by the rear motor 16r.

Figure 5:
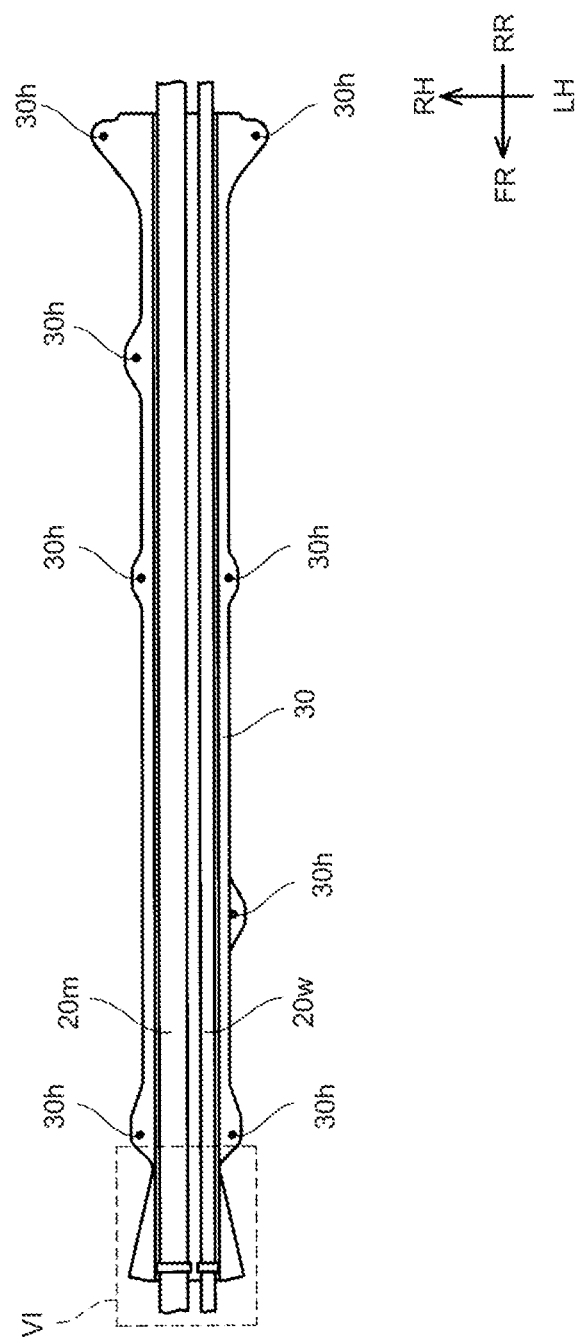
FIG. 5 is a top view of the harness cover.
Figure 6:
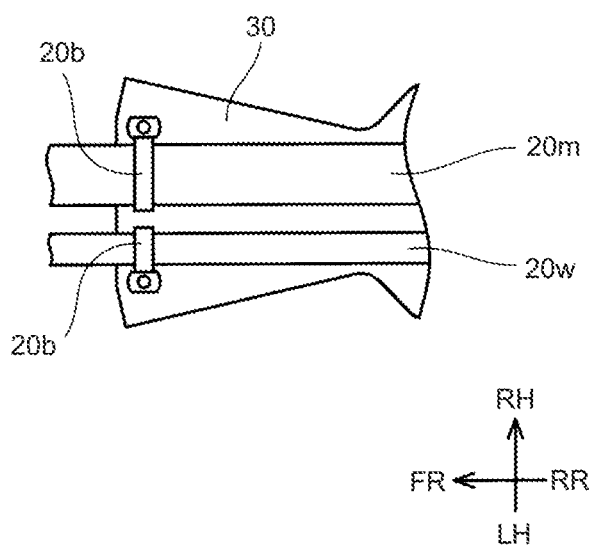
FIG. 6 is an enlarged view of a range of a dashed line VI of FIG. 5.

A structure of fixing the wire harness 20 (that is, the first wire harness 20m and the second wire harness 20w) to the harness cover 30 will be described with reference to FIGS. 5 and 6. As illustrated in FIG. 6, the first wire harness 20m and the second wire harness 20w are fixed to the harness cover 30 by the harness bands 20b, respectively. The harness band 20b is wound around the outer circumferences of the first wire harness 20m and the second wire harness 20w in a state where it is inserted into the through holes provided in the harness cover 30. As such, the first wire harness 20m and the second wire harness 20w are fixed to the harness cover 30.

As described above with reference to FIG. 4, by inserting the bolts 30s into the fixing holes 30h and screwing the nuts 30p into the bolts 30s, the harness cover 30 is fixed to the floor panel 12f. For this reason, when the harness cover 30 fixed to the floor panel 12f is removed from the floor panel 12f, the wire harness 20 is fixed to the harness cover 30 with the harness band 20b. In other words, the harness cover 30 is configured to be repeatedly detachable from the floor panel 12f in a state where the wire harness 20 (that is, the first wire harness 20m and the second wire harness 20w) is fixed to the harness cover 30.

The electrically driven vehicle 10 has various specifications. For example, the electrically driven vehicle 10 also has a so-called front-wheel drive specification that does not include the rear motor 16r. In that case, the first wire harness 20m that transmits power from the battery pack 18 to the rear motor 16r via the electric unit 15 is not required. Even in such a case, a manufacturer of the front-wheel drive electrically driven vehicle 10 fixes the harness cover 30 to which the first wire harness 20m is not fixed to the floor panel 12f using the bolts 30s and the nuts 30p. By making the harness cover 30 repeatedly detachable from the floor panel 12f, the manufacturer can manufacture the electrically driven vehicle 10 via the same work regardless of the number or type of wire harnesses 20.

The points to be noted in the embodiment will be described below. In the electrically driven vehicle 10 according to the embodiment, the harness cover 30 is fixed to the floor panel 12f by screwing the bolts 30s into the nuts 30p, but the harness cover 30 is not limited thereto, and may be, for example, welded to the lower surface of the floor panel 12f.

As described above, although specific examples of the present disclosure have been described in detail, they are mere examples and do not limit the claims. The technology described in the claims includes various modifications and changes of the specific examples described above. The technical elements described in the present specification or the drawings exert technical utility alone or in various combinations, and are not limited to the combinations of descriptions in the claims at the time of filing. In addition, the technology exemplified in the present specification or the drawings can achieve a plurality of objects at the same time, and has technical utility by achieving one of the objects.

What is claimed is:

1. An electrically driven vehicle comprising:
   at least one wheel driven by a motor;
   a vehicle body including a floor panel;
   a battery pack arranged on a lower side of the floor panel and configured to supply power to the motor;
   at least one wire harness extending in a front-rear direction of the electrically driven vehicle between the floor panel and the battery pack; and
   a harness cover extending in the front-rear direction of the electrically driven vehicle along the at least one wire harness and interposed between the at least one wire harness and the battery pack,
   wherein the floor panel includes a tunnel portion extending in the front-rear direction at a center thereof in a right-left direction,
   wherein the at least one wire harness is arranged inside the tunnel portion, and
   wherein the harness cover is fixed to the floor panel that defines the tunnel portion.

2. The electrically driven vehicle according to claim 1, wherein the electrically driven vehicle includes a plurality of wire harnesses.

3. The electrically driven vehicle according to claim 1, wherein the wire harness is fixed to the harness cover.

4. The electrically driven vehicle according to claim 1, wherein the harness cover is configured to be detachable from the floor panel in a state where the wire harness is fixed to the harness cover.

5. The electrically driven vehicle according to claim 1, wherein the wire harness includes a first wire harness for power.

6. The electrically driven vehicle according to claim 5, wherein the first wire harness for power is configured to transmit power between the motor and the battery pack.

7. The electrically driven vehicle according to claim 5, wherein the wire harness further includes a second wire harness for power, and a rated voltage of the second wire harness is smaller than a rated voltage of the first wire harness for power.

8. The electrically driven vehicle according to claim 1, wherein the wire harness includes a wire harness for signaling.

9. The electrically driven vehicle according to claim 8, wherein the wire harness for signaling includes a signal line that transmits or receives a signal associated with the motor.

10. The electrically driven vehicle according to claim 1, wherein the harness cover has a length extending in the front-rear direction greater than one meter.

* * * * *